Oct. 28, 1941.  W. K. BECKWITH  2,260,598
NUT RUNNER ATTACHMENT
Filed Aug. 21, 1939
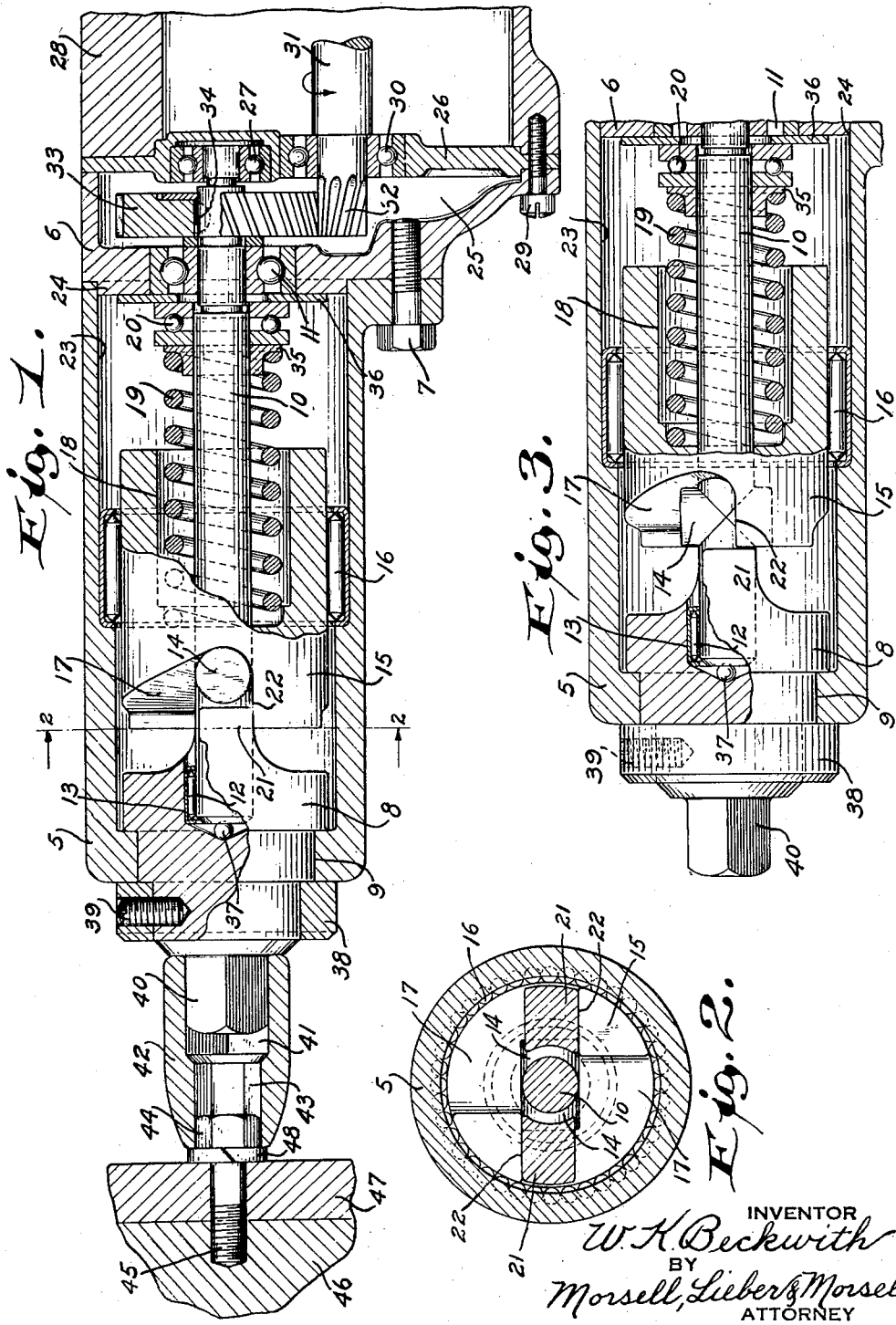
INVENTOR
W. K. Beckwith
BY
Morsell, Lieber & Morsell
ATTORNEY Patented Oct. 28, 1941

2,260,598

UNITED STATES PATENT OFFICE 2,260,598

NUT RUNNER ATTACHMENT

Wendell K. Beckwith, Shorewood, Wis., assignor to Milwaukee Electric Tool Corporation, Milwaukee, Wis., a corporation of Wisconsin Application August 21, 1939, Serial No. 291,166

3 Claims. (Cl. 192—30.5)

My invention relates in general to improvements in the art of applying screw threaded elements to their moorings, and relates more specifically to improvements in the construction and operation of so-called impact nut runners for insuring firm attachment of nuts to studs or of cap screws to threaded sockets.

Generally defined, an object of my present invention is to provide an improved impact nut runner which is simple in construction and highly efficient in use.

It has heretofore been proposed to facilitate the application of nuts to studs and cap screws to threaded sockets, by providing means for automatically tapping or imparting a succession of blows to the nut or cap screw when the resistance to further rotation of the driving socket reaches a predetermined high value. The application of these impacts, has been found quite advantageous in driving the rotary threaded element home against its final seating, and especially when the socket for rotating the nut or cap screw is driven by a high speed machine such as an electric motor. While some of the prior appliances for running nuts on studs and cap screws into tapped holes, have been relatively satisfactory in actual use, they have been too complicated in construction and not sufficiently dependable in operation to make them entirely satisfactory for diverse uses.

It is therefore a more specific object of my present invention to provide a new and useful nut runner attachment which is durable in construction, highly dependable in use, and which may be readily utilized in conjunction with high speed sources of driving power.

Another specific object of the present invention is to provide an impact appliance for driving nuts and cap screws, which will effectively apply such threaded elements without damaging the same.

A further specific object of this invention is to provide an improved impact nut runner for driving polygonal nuts and screw heads, which will automatically and most effectively apply the blows to the work, and which can also be manufactured at moderate cost.

These and other specific objects and advantages of my present invention will be apparent from the following detailed description.

A clear conception of an embodiment of the invention, and of the construction and operation of an impact nut runner built in accordance with my improvement, may be had by referring to the drawing accompanying and forming a part of this specification wherein like reference characters designate the same or similar parts in the various views.

Fig. 1 is a central longitudinal partial section through one of my improved nut runners, showing the same associated with a high speed drive and with a driven socket applied to a cap screw;

Fig. 2 is a transverse section through the impact nut runner of Fig. 1, taken along the line 2—2; and Fig. 3 is a fragmentary central longitudinal partial section through the device, showing the parts thereof in a different position of operation from that shown in Figs. 1 and 2.

While the invention has been shown and described herein as being specifically applied to a nut runner attachment for portable electric motor driven tools, it is not intended to thereby unnecessarily limit the scope or utility of the appliance.

Referring to the drawing, the improved nut runner attachment shown therein by way of illustration, comprises in general a cylindrical outer casing 5 having one end detachably secured to a closure head 6 by means of cap screws 7, and having a rotary anvil 8 journalled in a bore 9 at its opposite end; a hammer driving shaft 10 disposed centrally within the casing 5 and having one end portion journalled for rotation in a ball bearing 11 carried by the head 6, while its opposite extreme end is journalled in a roller bearing 12 mounted within a socket 13 in the anvil 8, the medial portion of the shaft 10 having oppositely extending integral lateral projections 14 thereon; a revolvable hammer 15 slidably embracing the shaft 10 and being journalled for rotation in a roller bearing 16 mounted within the casing 5, the hammer 15 having a pair of cam surfaces 17 at one end cooperable with the projections 14 and having a recess 18 in its opposite end; a relatively heavy helical compression spring 19 surrounding the shaft 10 and having one end coacting with the hammer 15 within the recess 18 while its opposite end reacts against the end head 6 through a ball thrust bearing 20; a pair of impact lugs or projections 21 formed integral with the anvil 8 on opposite sides of the shaft 10 and being engageable with abutment surfaces 22 formed on the hammer 15; mechanism for driving the shaft 10 at relatively high speed; and means associated with the revolving anvil 8 for imparting rotary motion with impacts to the work.

The enclosing casing 5 should be of durable construction and accurately machined to maintain the shaft 10 centrally thereof; and in order to maintain such true alinement of the shaft 10, the portion of the casing within which the roller bearing 16 is snugly confined, is provided with a counter-bore 23 the end of which snugly embraces a cylindrical projection 24 on the end closure head 6. The head 6 is provided with a cavity 25 the end of which is normally closed by a partition 26, and the extreme end of the shaft 10 is journalled in a ball bearing 27 carried by the partition 26, as shown in Fig. 1. The partition 26 may be secured to the head 6 and to a motor housing 28 or other support, by means of cap screws 29; and also provides a support for another ball bearing 30 within which a high speed driving shaft 31 is journalled. The driving shaft 31 is disposed parallel to the driven shaft 10, and the end of the shaft 31 which is disposed within the cavity 25 has a helical-toothed pinion 32 formed thereon which meshes with a helical gear 33 secured to the shaft 10 between the ball bearings 11, 30 by means of a key 34. The shaft 31 may be rotated at will, by an electric motor or the like enclosed within the housing 28, in an obvious manner.

The ball thrust bearing 20 against which the spring 19 reacts through a collar 35, in turn reacts against the end head 6 through a plate 36, and all of the other ball bearings 11, 27, 30 are preferably of a thrust resistant type which will prevent objectionable axial shifting of the shafts 10, 31. The roller bearings 12, 16 which center the shaft 10 and hammer 15 respectively, are of the needle roller type, and the end of the shaft 10 which is disposed nearest the bearing 12, coacts with the anvil 8 through a bearing ball 37. The anvil 8 is prevented from shifting axially within the bore 9 of the casing 5, by means of a collar 38 secured to the reduced end of the anvil 8 by a set screw 39, and the outer extremity of the anvil 8 has a square driving head or shank 40 formed integral therewith in alinement with the shaft 10. The shank 40 is adapted to snugly engage a square socket 41 in one end of a socketed coupling 42, the opposite end of which has a hexagonal socket 43 formed for snug coaction with a standard cap screw head 44 or nut, or with any other threaded element formed to fit the socket 43. The cap screw 45 of which the head 44 is an integral part, has a threaded shank cooperable with an object 46 having a threaded socket, and the head 44 of the screw 45 coacts with another member 47 through a split spring washer 48 in a well known manner.

All parts of my improved impact nut runner attachment are obviously formed for quick and convenient assembly and dismantling, and when the appliance has been properly constructed and assembled for normal use, the various bearings and moving parts should be supplied with an abundance of lubrication such as grease housed within the several compartments. During normal use of the nut runner, and assuming the various parts to be assembled and associated with the work as shown in Fig. 1, when the driving shaft 31 is rotated at high speed before the cap screw 45 has been driven home or offers excessive resistance, the helical stiff spring 19 will retain the shaft projections 14 in contact with the hammer surfaces 22; and rotation of the shaft 31 will then be transmitted through the gears 32, 33 to the shaft 10 and projections 14, from these projections 14 to the hammer 15 and surfaces 22, from the surfaces 22 to the anvil 8 through the projections 21, and from the anvil 8 to the cap screw 45 through the coupling 42 in an obvious manner. The hammer 15 during said normal driving, will not be displaced along the driven shaft 10, and the spring 19 will remain fully expanded.

As the torque required to rotate the nut or cap screw 45 increases due to engagement of the head 44 with the washer 48 or for any other reason, the shaft projections 14 will begin to ride along the inclined cam surfaces of the hammer 15 because the free rotation of this hammer is then being resisted by the lips or projections on the anvil 8 coacting with the hammer surfaces 22. This advancement of the shaft projections 14 along the inclined surfaces pushes the hammer 15 bodily away from the anvil 8 and thereby compresses the spring 19, and this axial movement of the hammer 15 continues until the inner ends of the anvil lugs or projections 21 are removed from contact with the hammer surfaces 22, whereupon the anvil lugs will clear the end of the revolving hammer 15 as shown in Fig. 3. With the projections 21 thus positioned, the hammer 15 is again free to rotate, but the compressed spring 19 will tend to snap or quickly return the hammer 15 to normal driving position, so that when the hammer has been rotated approximately one quarter of a revolution relative to the momentarily fixed anvil 8, the spring 19 will become quickly effective to move the hammer 15 back to normal position with the impact surfaces 22 revolving in the path of the anvil projections 21. The revolving hammer surfaces 22 will then deliver a sharp impact against the corresponding anvil lugs or projections 21, and will thus impart impacts against the faces of the polygonal screw head 44, and the shaft projections 14 will ride downwardly along the inclined cam surfaces 17 whenever the spring 19 is freed for expansion to thereby restore the assemblage to the condition illustrated in Fig. 1. Because of the fact that the shaft 10 is revolving at high speed, the delivery of the successive impacts will be repeated in rapid succession until the cap screw 45 is driven firmly in place and the coupling 42 is removed therefrom, and each impact is augmented by the fact that whenever the spring 19 returns the hammer 15 to normal position with the shaft projections 14 in contact with the adjacent impact surfaces 22, the hammer 15 travels at a much higher rotative speed than that of the shaft 10 and therefore delivers a sharp blow each time that the surfaces 22 are returned to the path of travel of the anvil projections 21. It will thus be noted, that whenever the rotation of the anvil 8 is excessively obstructed and the rotation of the shaft 10 continues, two sharp blows or impacts will be delivered to the anvil and cap screw 44 during each complete revolution of the shaft 10, and that these impacts or blows will continue until the resistance to rotation of the anvil 8 is removed.

From the foregoing detailed description it will be apparent that my present invention provides an improved impact nut runner which is simple and compact in construction and which is moreover highly efficient in operation. The device may be readily applied to or associated with any suitable source of propelling power such as an electric motor or other portable driving tool, and while the impact feature will not function during normal driving of a nut or cap screw, this improved action is always ready for normal functioning and comes into effect automatically whenever the resistance to rotation of the anvil 8 becomes excessive. While the impact action is probably most effective when operating at high speed, the appliance may also be utilized during slow speed operation, and the impacts of the rapidly revolving hammer 15 augmented as they are by the action of the strong spring 19, are delivered to the momentarily stationary ram or anvil 8 and from thence to the work in a most effective manner without danger of injuring the operator or of damaging the work. The various bearings and movable parts may be kept well lubricated at all times in order to minimize the wear, and all parts are readily removable for inspection and possible replacement. All parts of the attachment are moreover durable in construction and readily machinable so that the device may be manufactured at moderate cost. The invention has proven highly successful in actual use, and the improved nut runner is extremely compact and requires no special degree of skill and dexterity in its application and use. The socketed coupling 42 and shank 40 may be modified of course to properly coact with various types of work, and the apparatus may be used either with portable or stationary tools.

It should be understood that it is not desired to limit this invention to the exact details of construction or to the precise mode of operation, herein shown and described, for various modifications within the scope of the claims may occur to persons skilled in the art.

I claim:

1. In combination, a tubular casing, a hammer intermittently rotatable and reciprocable within and relative to the central axis of said casing, said hammer having a succession of approximately helical end cam surfaces the opposite ends of each of which terminate in abrupt ledges extending parallel to said axis, a continuously rotatable shaft journalled in said casing and having a rigid radial projection adapted to ride along said cam surfaces in succession to move said ledges parallel to said axis, an anvil intermittently rotatable and impactable by said hammer ledges and being cooperable with turnable work, and resilient means for constantly urging said hammer toward said shaft projection.

2. In combination, a tubular casing, an annular hammer intermittently rotatable and reciprocable within and relative to the central axis of said casing, said hammer having an annular series of approximately helical end cam surfaces the opposite ends of each of which terminate in abrupt ledges extending parallel to said axis, a continuously rotatable shaft journalled in said casing and extending through said hammer and having diametrically opposite rigid radial projections adapted to ride along said cam surfaces in succession to move said ledges parallel to said axis, an anvil intermittently rotatable and impactable by said hammer ledges and being cooperable with turnable work, and a spring coacting with said hammer within said casing for constantly urging said hammer toward said shaft projections.

3. In combination, a tubular casing, an annular hammer intermittently rotatable and reciprocable within and relative to the central axis of said casing, said hammer having an annular series of approximately helical end cam surfaces the opposite ends of each of which terminate in abrupt ledges extending parallel to said axis, a continuously rotatable shaft journalled in said casing and extending through said hammer and having diametrically opposite rigid radial projections adapted to ride along said cam surfaces in succession to move said ledges parallel to said axis, an anvil intermittently rotatable and impactable by said hammer ledges and being cooperable with turnable work, the end of said shaft on one side of said projections being journalled in said casing and the opposite end thereof on the other side of said projections being journalled in said anvil, and a spring coacting with said hammer within said casing for constantly urging said hammer toward said shaft projections.

WENDELL K. BECKWITH.